United States Patent [19]
Dortzbach

[11] Patent Number: 5,402,830
[45] Date of Patent: Apr. 4, 1995

[54] THERMAL PIPE GUARD

[76] Inventor: Richard A. Dortzbach, 12801 Marsh Creek Rd., Clayton, Calif. 94517

[21] Appl. No.: 145,959

[22] Filed: Oct. 29, 1993

[51] Int. Cl.6 .................................................. F16L 11/00
[52] U.S. Cl. .................................. 138/110; 138/112; 138/113; 138/160
[58] Field of Search .............. 138/110, 112, 113, 106, 138/108, 114, 115, 117, 161, 163, 158, 147–149, 160

[56] References Cited

U.S. PATENT DOCUMENTS

| | | | |
|---|---|---|---|
| 2,489,847 | 11/1949 | Arnold | 237/79 |
| 3,237,716 | 3/1966 | Parsons | 181/72 |
| 3,714,750 | 2/1973 | Pallotto | 52/221 |
| 3,741,252 | 6/1973 | Williams | 138/110 |
| 4,490,954 | 1/1985 | Cresti | 52/221 |
| 4,501,302 | 2/1985 | Harwood | 138/113 |
| 4,892,087 | 1/1990 | Bridgwater | 126/512 |
| 5,055,334 | 10/1991 | Lechuga | 428/99 |
| 5,303,744 | 4/1994 | Eriksson | 138/110 |

*Primary Examiner*—Timothy F. Simone
*Assistant Examiner*—Patrick F. Brinson
*Attorney, Agent, or Firm*—James R. Cypher

[57] ABSTRACT

A thermal guard for pipes to protect personnel from hot or cold pipes in refineries, chemical plants and other places processing hot or cold fluids. The guard is made from metal and contains no insulation so that the pipes are readily visible for observing leaks and can be readily repaired. The guard is fabricated from a few easily fabricated and assembled parts which can be attached to pipes of various sizes.

9 Claims, 7 Drawing Sheets

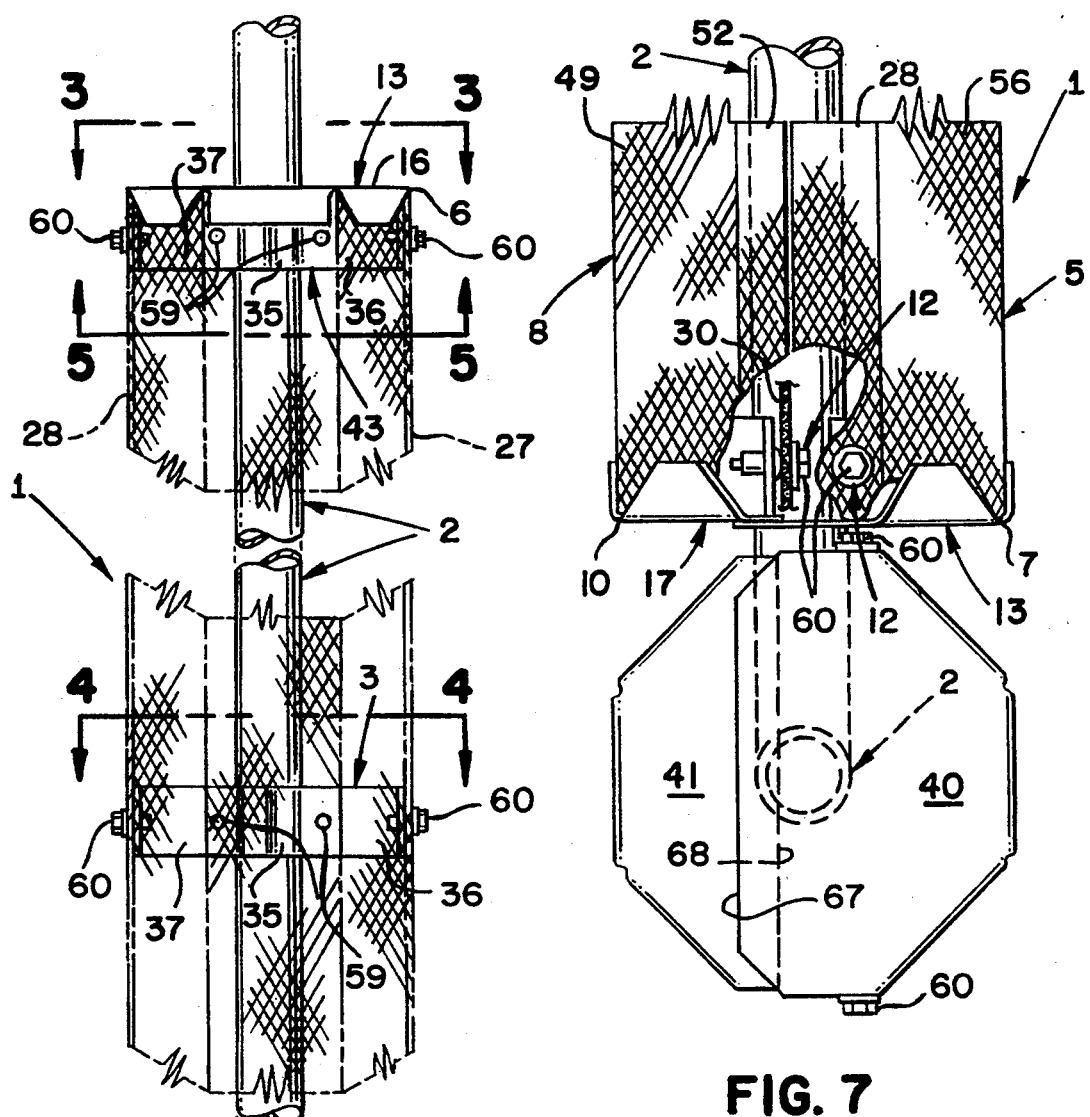
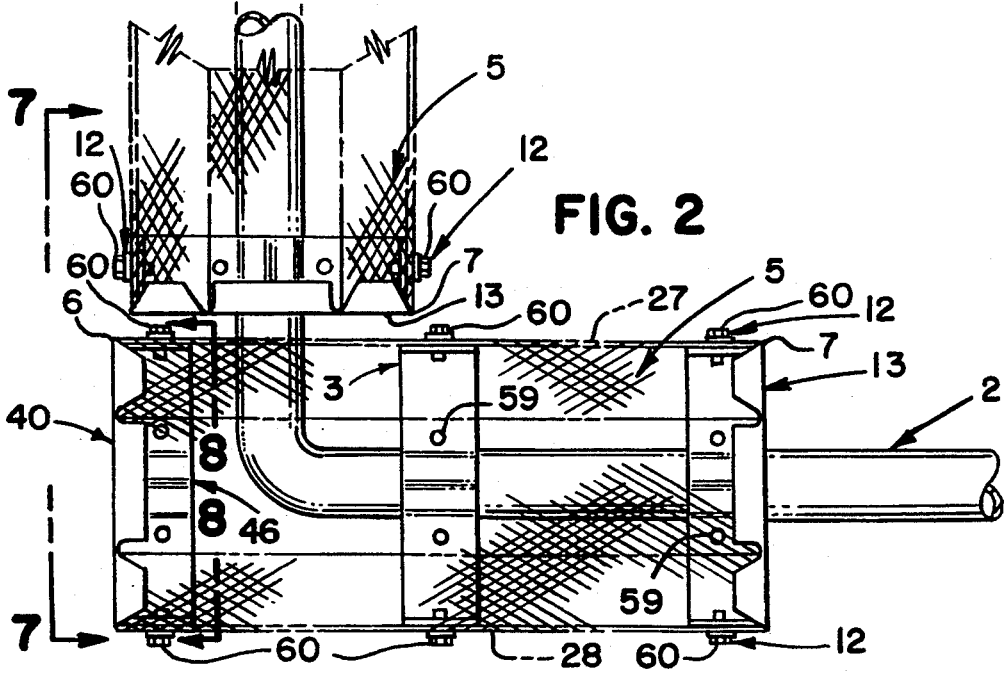
FIG. 2
FIG. 7

THERMAL PIPE GUARD

This invention relates to a thermal pipe guard for refineries and chemical plants where personnel must be protected from pipes of either hot or cold extreme temperature differentials, but where it is not necessary to insulate the pipes to keep the liquids carried by the pipe at an even temperature.

It is often advantageous not to insulate pipes where hot pipes are exposed to the atmosphere where moisture could condense, and if trapped by the insulation cause rusting of the pipes. Where hazardous liquids are carried by the pipes, repairs of pipes due to rusting pipes are expensive. Also, leaks of hazardous liquids can contaminate the insulation which then must be disposed of as a hazardous waste.

It is an object of this invention to provide a pipe guard which does not require insulation, but yet is capable of protecting personnel from thermal burns.

Another object is to provide a guard which does not obscure the pipe so that leaks can be easily detected.

A further object is to provide a guard which is adjustable and can be used with several size pipes with only slight field modification of the guard members and made of various metals such as galvanized, stainless and aluminum.

A still further object is to provide a guard which can be easily removed from a pipe and reused on pipe in another installation.

Another object is to provide a guard which requires no welding in the field so that it can be installed in areas of refineries and chemical plants where welding is prohibited.

Still another object is to provide a guard which can be constructed to guard a number of different pipe sizes and lengths with a minimum number of different parts.

Another object is to provide a guard which can be assembled with common tools by persons with minimal skills and training.

SUMMARY OF THE INVENTION

The gist of the present invention is the use of a pair of polygonal expanded metal members spaced on opposite sides of a pipe to be guarded with one expanded metal member overlapping the other when guarding smaller diameter pipes and moving outwardly when constructed to guard larger diameter pipes. A pair of brackets affixed to the expanded metal members, clamped to the pipe, and secured to each other by fasteners is all that it is necessary to form a basic guard. End caps secured to the pipe and to the expanded metal members cover the sharp ends of the expanded metal.

BRIEF DESCRIPTION OF THE DRAWINGS

FIG. 2 is a front elevation view of the invention assembled to protect an elongated pipe portion and a bend at a 90 degree angle.

FIG. 7 is a side elevation view taken along line 7—7 of FIG. 2.

BRIEF DESCRIPTION OF THE PREFERRED EMBODIMENTS OF THE INVENTION

Figure 1:
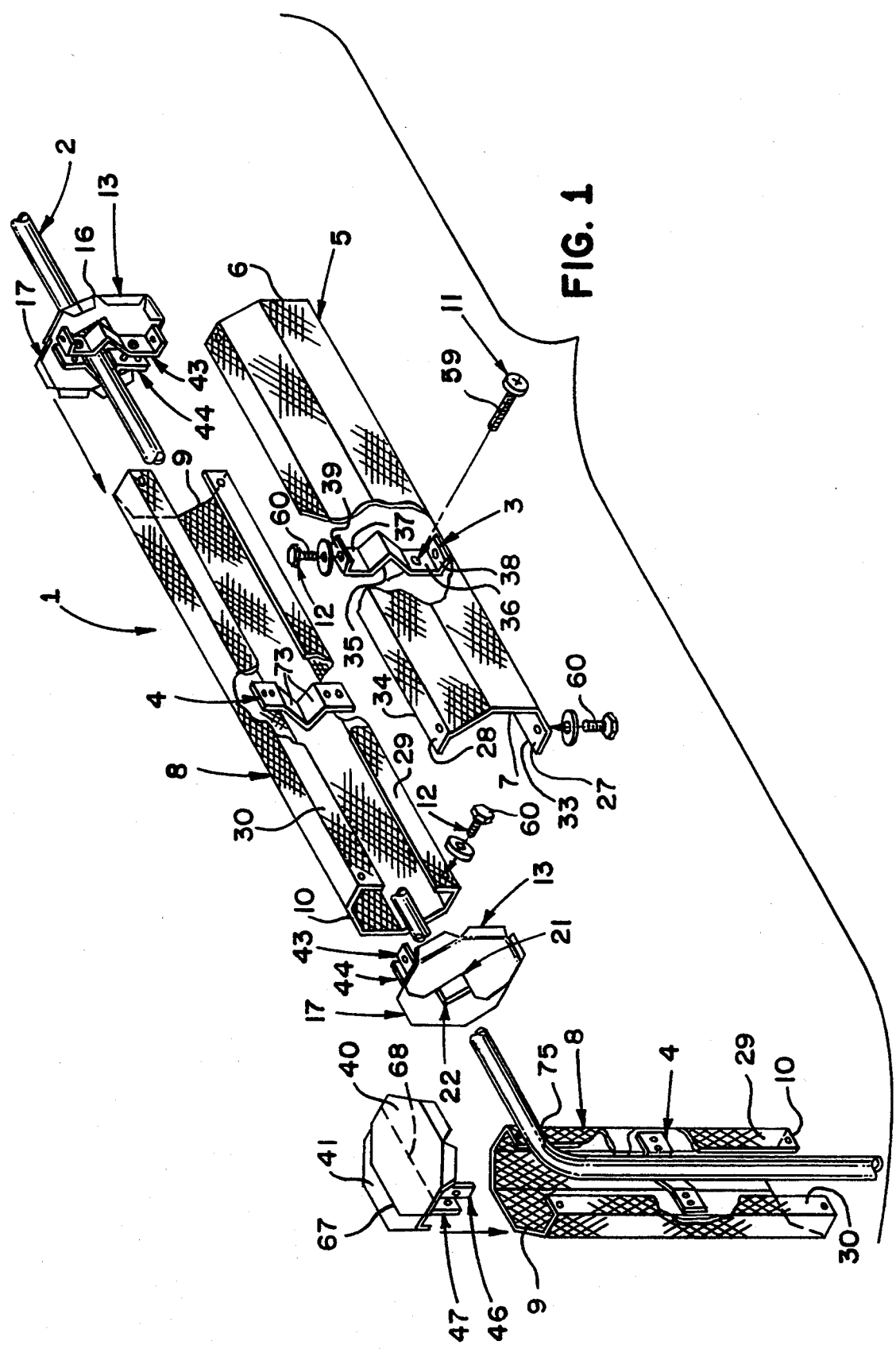
FIG. 1 is an exploded perspective view of the thermal pipe guard constructed in accordance with the present invention.

The thermal guard 1 of the present invention for a pipe 2 includes: a first clamp bracket 3 dimensioned for clamping engagement with the pipe 2; a second clamp bracket 4 spaced from the first clamp bracket 3 and dimensioned for clamping engagement with the pipe 2; a first shield member 5 spaced from and partially surrounding the pipe 2 and having first and second end edges 6 and 7; a second shield member 8 spaced from and partially surrounding the pipe 2 and having first and second end edges 9 and 10 disposed in close proximity to the first and second end edges 6 and 7 respectively of the first shield member 5; clamp bracket fastener means 11 joining the first and second clamp brackets 3 and 4 so as to hold the pipe 2 in a close embrace; and clamp-to-shield fastener means 12 joining the first and second shield members 5 and 8 to the first and second clamp brackets 3 and 4.

The thermal guard 1 may be further described as including: a first starter plate 13 having an inner edge 14 in close proximity to a first portion 15 of the circumference of the pipe 2 and an outer edge 16 in close proximity to the first end edge 6 of the first shield member 5; a second starter plate 17 having an inner edge 18 in close proximity to a second portion 19 of the circumference of the pipe 2; and starter plate joining means 20 for attaching the first and second starter plates 13 and 17 to the pipe 2.

Another feature of the thermal guard 1 is the fact that the inner edges 14 and 18 of the first and second starter plates 13 and 17 are each formed with a notch 21 and 22 for more closely matching the contour of the pipe 2; and portions 23 and 24 of the first starter plate 13 overlap portions 25 and 26 of the second starter plate 17.

Preferably, the thermal guard is constructed so that the notches 21 and 22 of the inner edges 14 and 18 of the first and second starter plates 13 and 17 are formed in a "V" shape.

Adjustability of the thermal guard to fit pipes of various diameters is accomplished by constructing the thermal guard 1 so that the first shield member 5 is formed with first and second end members 27 and 28; the second shield member 8 is formed with first and second end members 29 and 30; and the first and second shield members 5 and 8 are dimensioned to have a first position wherein a portion of the first and second end members 27 and 28 overlap a portion of the lands 51 and 52 of the second shield member 8 and a second position wherein the first and second end members 27 and 28 of the first shield member 5 do not overlap lands 51 and 52 but first and second end members 27 and 28 have shield edges 33 and 34 in close proximity to edges 78 and 79 of lands 51 and 52 of the second shield member 8".

Figure 5:
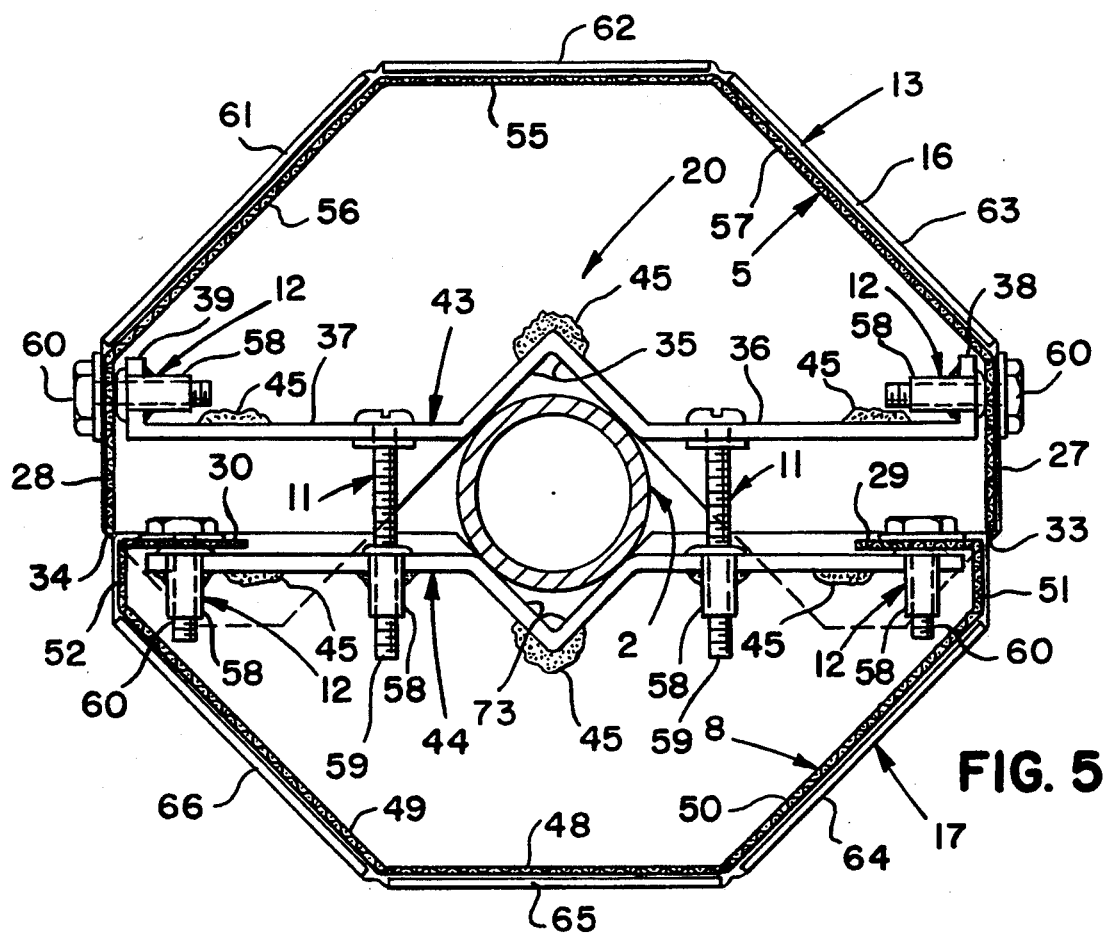
FIG. 5 is a cross sectional view taken along line 5—5 of FIG. 2.
Figure 6:
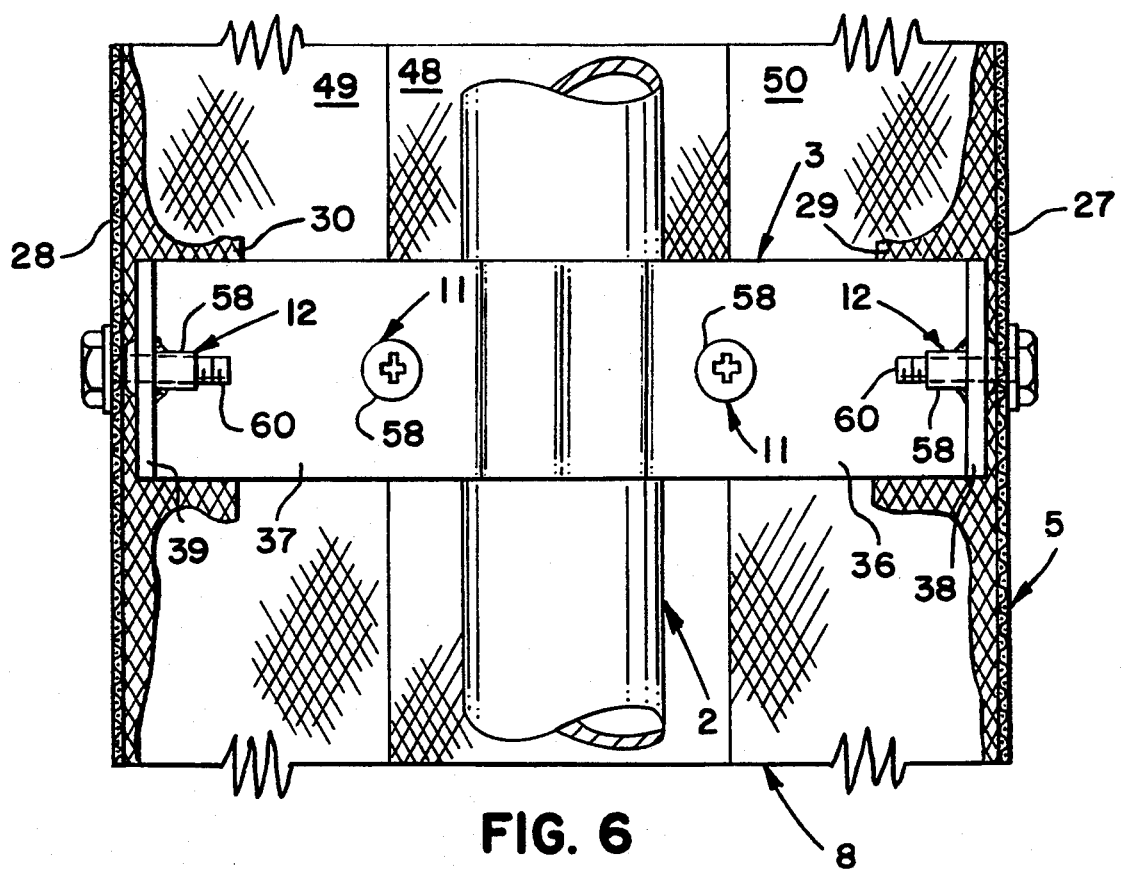
FIG. 6 is a cross sectional view taken along line 6—6 of FIG. 4.

Referring to FIG. 5, the starter plate joining means 20 for attaching the first and second starter plates 13 and 17 to the pipe 2 includes: a third clamp bracket 43 dimensioned for clamping engagement with the pipe 2; a fourth clamp bracket 44 spaced from the third clamp bracket 43 and dimensioned for clamping engagement with the pipe 2; clamp bracket fastener means 11 joining the third and fourth clamp brackets 43 and 44 so as to hold the pipe 2 in a close embrace; weld means 45 joining the first starter plate 13 to the third clamp bracket 43; and weld means 45 joining the second starter plate 17 to the fourth clamp bracket 44.

The thermal guard 1 may be further described as including: a first end plate cap 40 dimensioned for covering a portion of the first end edges 6 and 9 of the first and second shield members 5 and 8; a second end plate cap 41 dimensioned for covering a portion of the first end edges 6 and 9 of the first and second shield members 5 and 8 and in combination with the first end plate cap 40 covering substantially all of the first end edges 6 and 9 of the first and second shield members 5 and 8; the first and second end plate caps 40 and 41 are mounted respectively on the first end edges 6 and 9 of the first and second shield members 5 and 8 so as to partially overlap one another; and cap joining means 42 joining the first and second end plate caps 40 and 41 to the first and second shield members 5 and 8.

The cap joining means 42 for joining the first and second end plate caps 40 and 41 to the first and second shield members 5 and 8 includes: a fifth clamp bracket 46 dimensioned for engagement with the first end plate cap 40; a sixth clamp bracket 47 spaced from the fifth clamp bracket 46 and dimensioned for engagement with the second end plate cap 41; clamp bracket fastener means 11 joining the fifth and sixth clamp brackets 46 and 47 so as to hold the fifth and sixth clamp brackets 46 and 47; weld means 45 joining the first end plate cap 40 to the fifth clamp bracket 46; and weld means 45 joining the second end plate cap 41 to the sixth clamp bracket 47.

Preferably the first clamp bracket 3 includes a pipe engaging portion 35 formed in the shape of a "V", a first extension 36 connected to one end of the pipe engaging portion 35 and a second extension 37 connected to the other end of the pipe engaging portion 35, and a first lug 38 connected to the first extension 36 and a second lug 39 connected to the second extension 37.

The thermal guard I may be constructed of various materials but preferably the first and second shield members 5 and 8 are formed from expanded sheet metal.

ADJUSTABLE TO DIFFERENT SIZE PIPES

Figure 9:
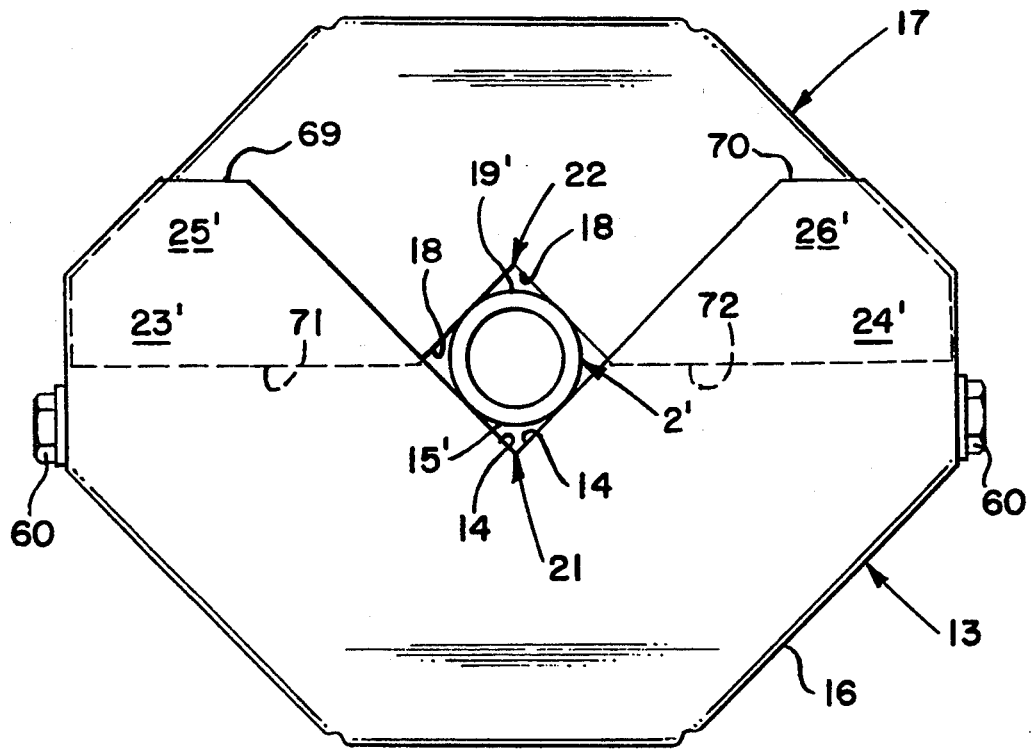
FIG. 9 is a top plan view similar to the top plan view illustrated in FIG. 3, but with the starter plate modified to guard a smaller size pipe.
Figure 10:
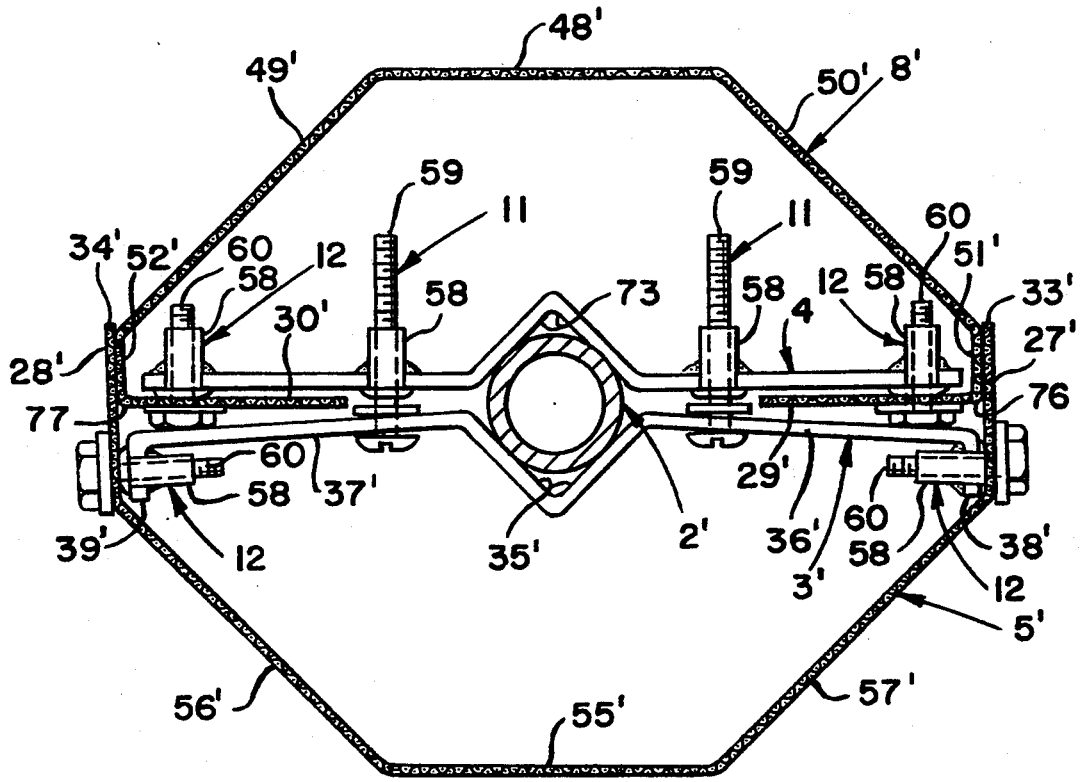
FIG. 10 is a cross sectional view similar to FIG. 4, but with the guard modified to guard a smaller size pipe as illustrated in FIG. 9.
Figure 11:
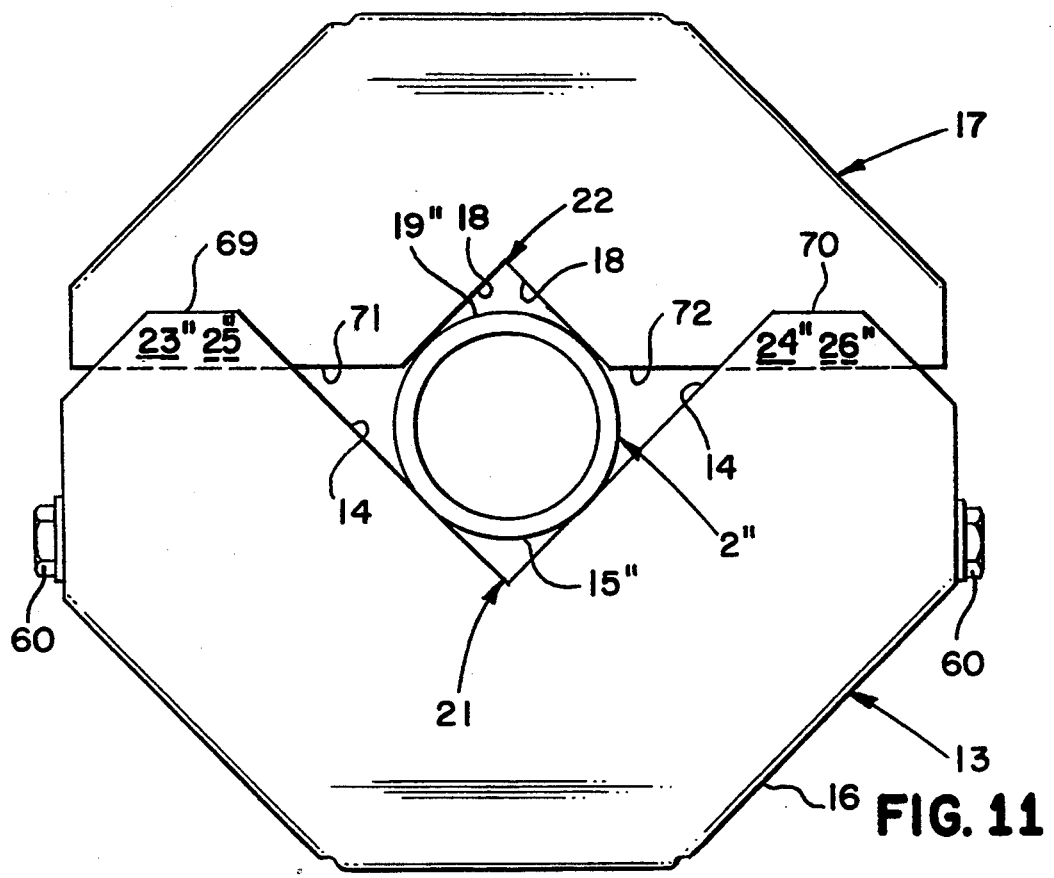
FIG. 11 is a top plan view similar to FIGS. 3 and 9, but with the guard modified in a further manner to guard a pipe larger than either of the pipes illustrated in FIGS. 3 and 9.
Figure 12:
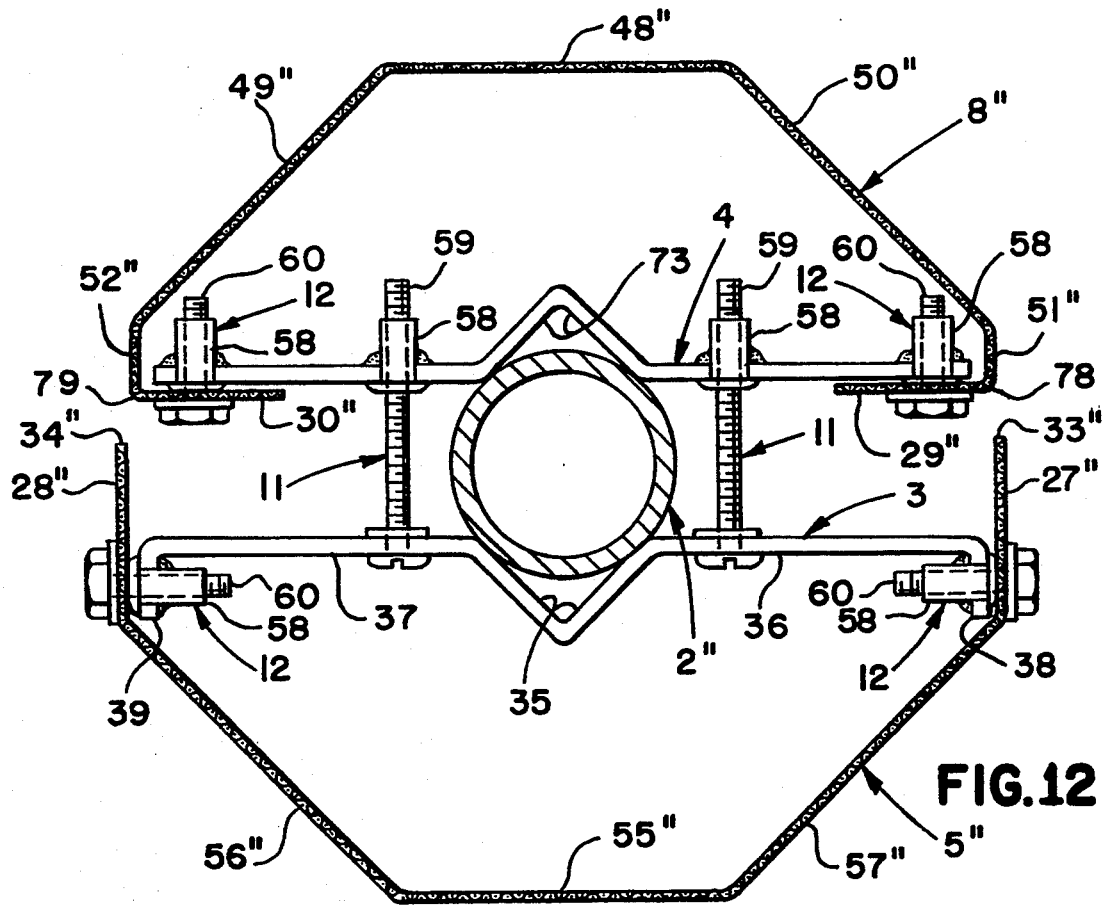
FIG. 12 is a cross sectional view similar to FIGS. 4 and 10, but with the guard modified as in FIG. 11 to guard a pipe larger than either of the pipes illustrated in FIGS. 4 and 10.

One of the major features of the present invention is the fact that the same parts, with only minor bending of the first and second shield members 5 and 8, can be used to fit a wide range of different size pipes. For example, one set of parts might be sized to fit a range of pipe sizes from $\frac{1}{2}$" to $1\frac{1}{4}$", while another set of parts might be sized to fit pipe sizes ranging from $1\frac{1}{2}$" to $2\frac{1}{2}$". For very large sizes of $2\frac{1}{2}$" to $3\frac{1}{2}$" still another set of parts might be provided. To demonstrate the use of a single size of parts to fit various size pipes, FIGS. 3, 4, 5, 6 and 8, illustrate the construction of a thermal guard around a 1" pipe (Actual Size 1 15/16") reduced to $\frac{3}{4}$ size; FIGS. 9 and 10 illustrate a $\frac{1}{2}$" pipe (Actual Size 13/16") reduced to $\frac{3}{4}$" size; and FIGS. 11 and 12 illustrate a $1\frac{1}{2}$" pipe (Actual size $1\frac{5}{8}$") reduced to $\frac{3}{4}$" size.

Where the parts are identical in all of the figures of the drawings, the identical numbering system and description of parts is used. To differentiate the different overall diameter size of the first and second shield members 5 and 8, which are identical in size but differ only by certain bends, the numbers of the parts of the second shield member 8 in FIGS. 9 and 10 and the pipe have been changed only by adding a single prime ('), while FIGS. 11 and 12 showing the large size pipe have been changed by adding a double prime (").

As may be seen, only bends in second shield members 8 are necessary to accommodate the three different size pipes.

Figure 4:
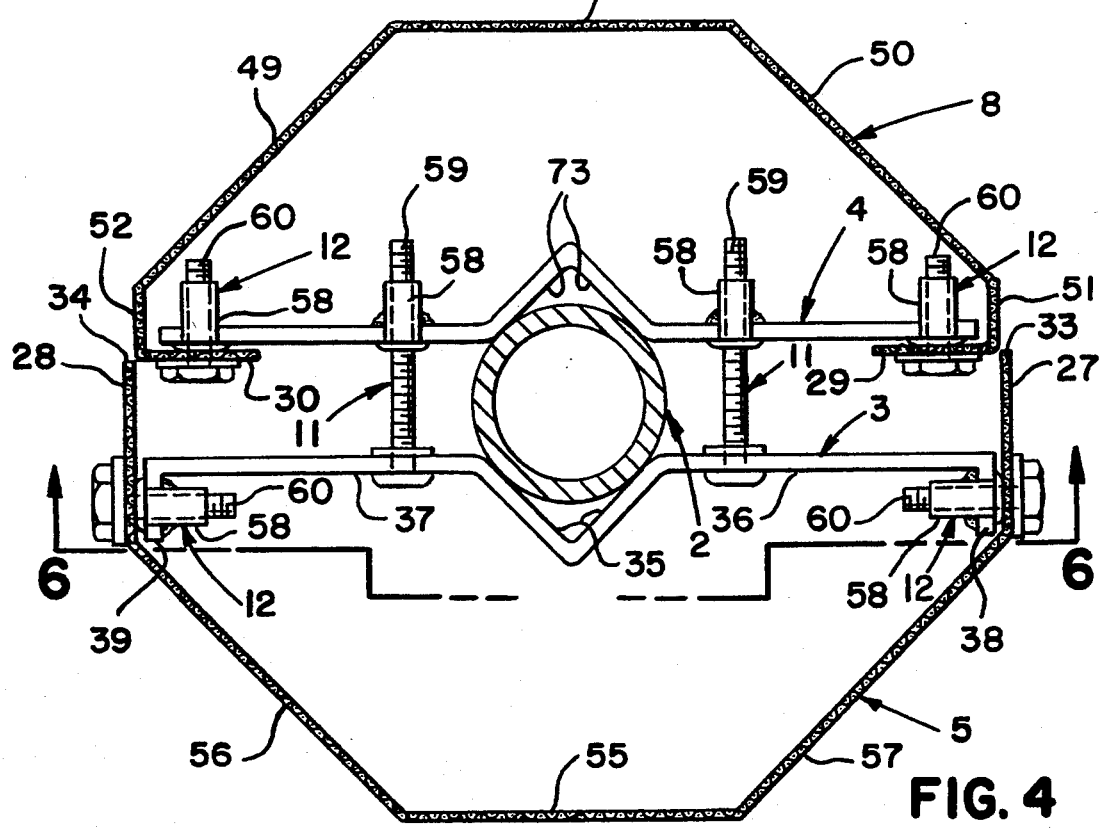
FIG. 4 is a cross sectional view taken along line 4—4 of FIG. 2.

Referring to FIG. 4, note that first and second end members 27 and 28 of first shield member 5 do not overlap any part of second shield member 8. In contrast, as illustrated in FIG. 10, note how first and second end members 27 and 28 of first shield member 5 overlap lands 51 and 52 of second shield member 8'. Note further, that in FIG. 12, when accommodating a larger size pipe 2", there is a gap of about $\frac{1}{4}$" between the shield edges 33 and 34 of first and second end members 27 and 28 of first shield member 5 and edges 78 and 79 of lands 51 and 52 of second shield member 8". A gap of about $\frac{1}{4}$" is acceptable in thermal guards and will prevent a person from sticking a finger through the guard.

FABRICATION OF THE THERMAL GUARD

Manufacture and welding of all of the parts of the thermal guard 1 is completed in the manufacturer's shop. All of the assembly takes place at the job site. The only tools needed at the job site are a pair of tin snips, a screw driver and a small wrench. The lengths of the thermal guards 1 and the pipe sizes to be guarded are taken, and the proper size clamp members, shield members, starter plates and end plate caps are selected. The shield members are cut to the proper length, generally, up to 4 feet in length and then bent as illustrated in the drawings. Referring to FIGS. 3, 5, 6, 8 and 13, and particularly to FIG. 4, second shield member 8 may be bent with a flat land 48, two angularly related lands 49 and 50, two lands 51 and 52 angled at 90° to land 48, and second end members 29 and 30. The number of lands could be increased or completely rounded depending upon the equipment available and the needs of the customer.

First shield member 5 is then cut to length and bent as illustrated in FIG. 4 with flat land 55, and angularly related lands 56 and 57. Again, the length of the lands 55, 56 and 57 are arbitrary and in fact the shape could be curvilinear. Where flat land construction is used, first and second end members 27 and 28 should be generally flat as will be explained later with respect to overlapping lands 51 and 52.

First clamp bracket 3 is cut to length in the shop, holes punched and bent as illustrated. Threaded inserts as indicated by the number 58 are placed in the punched openings and swedged to a friction fit by a commercial swedging tool. Threaded bolts 59 and 60 of the required length, size and number, as well as washers are provided by the factory, but generally not threadably inserted in the threaded inserts 58 at the factory.

Second clamp bracket 4 is cut to length in the shop, holes punched and then bent as illustrated with a V-shaped configuration in the center forming pipe engaging surfaces 73. Threaded inserts as indicated by the number 58 are placed in the punched openings and swedged to a friction fit by a commercial swedging tool. Threaded bolts 59 and 60 of the required length, size and number as well as washers are provided by the factory, but generally not threadably inserted in the threaded inserts 58 at the factory.

Figure 3:
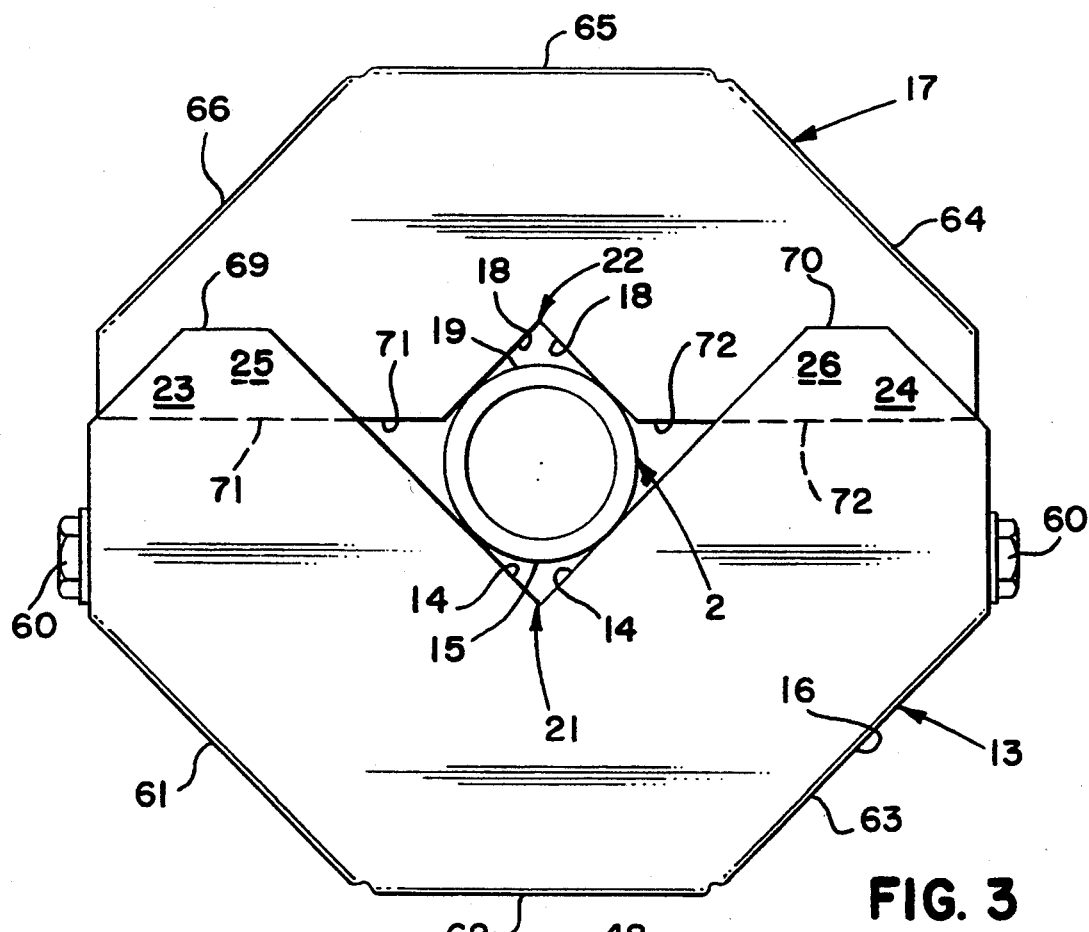
FIG. 3 is a top plan view taken along line 3—3 of FIG. 2.
Figure 13:
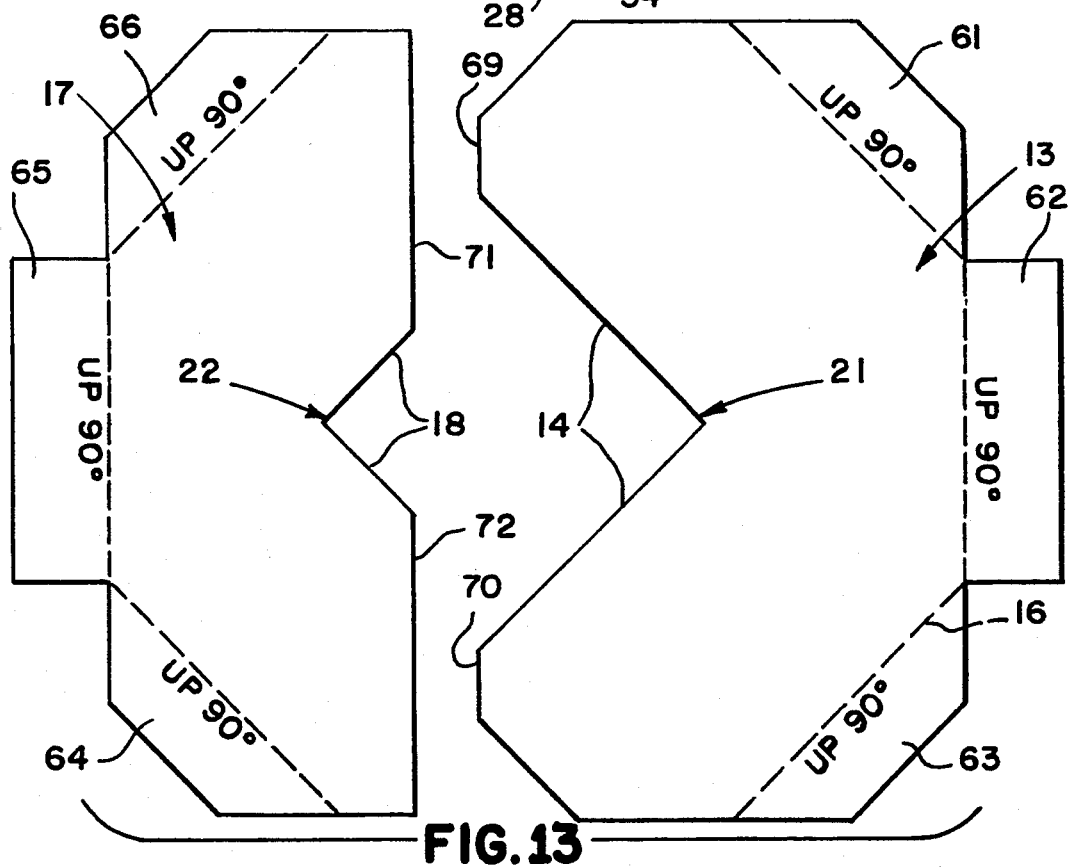
FIG. 13 is a plan view of the blank used to form the starter plate illustrated in FIGS. 3, 9 and 11.

Referring to FIGS. 2, 3 and 13, fabrication of the first and second starter plates 13 and 17 are fabricated from a suitable gauge metal such as 16 gauge. First blanks are cut as illustrated in FIG. 13 and previously described. Tabs 61-66 may be bent at 90° to provide a neat appearance and to cover the sharp edges of the expanded metal. The first and second starter plates 13 and 17 are then welded to the third and fourth clamp brackets 43 and 44 as illustrated in FIG. 5.

As illustrated in FIG. 3, edges 69 and 70 of first start plate 13 may overlap edges 71 and 72 of second starter plate 17, or they may be slightly overlapped as illustrated in FIG. 11, or they may be greatly overlapped as illustrated in FIG. 9 depending on the size of the pipe to be guarded.

Referring to FIGS. 1, 2, 3 and 5, it may be seen that third and fourth clamp brackets 43 and 44 are identical to first and second clamp brackets 3 and 4 and operate in the identical manner as described above which need not be repeated. In addition like parts have been given identical numbers. As may be seen in FIG. 5, however, third and fourth clamp brackets 43 and 44 are joined to first and second starter plates 13 and 17 respectively by welds 45.

Figure 8:
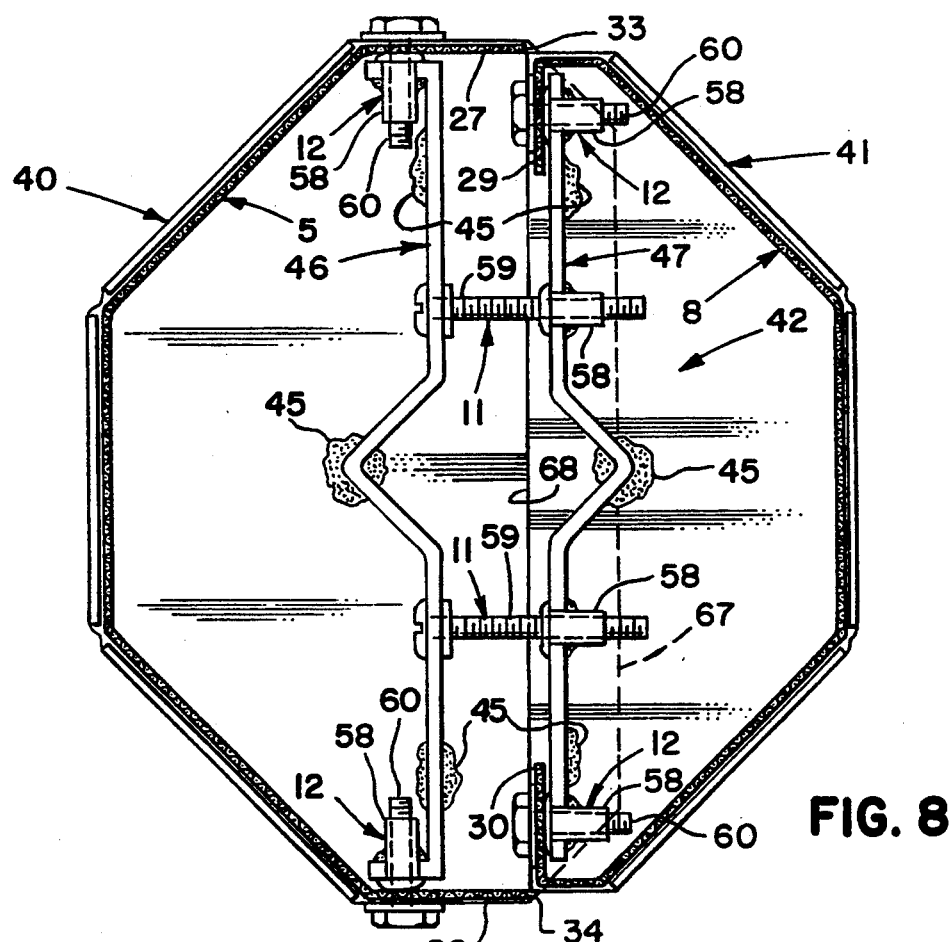
FIG. 8 is a cross sectional view taken along line 8—8 of FIG. 2.

Referring to FIGS. 1, 2, 7 and 8, first and second end plate caps 40 and 41 are cut in the shape illustrated in the drawings and welded to fifth and sixth clamp brackets 46 and 47 by welds 45 as illustrated in FIG. 8. Fifth and sixth clamp brackets 46 and 47 may be identically constructed to first and second clamp brackets 3 and 4 and third and fourth clamp brackets 43 and 44 as illustrated in FIG. 5, or they may be constructed without the "V" shaped pipe engaging portions 35 and 73 since no portion of fifth and sixth clamp brackets 46 and 47 actually clamp to the pipe. Since all of the clamp brackets are identically constructed, and the function is identical except as just noted, like numbers have been given to like parts and no further description is deemed necessary.

The first and second end plate caps 40 and 41, may overlap as illustrated in FIG. 7, or the edges 67 and 68 may be abutting, or the edges 67 and 68 might be spaced apart depending upon the size of the pipe to be guarded.

ASSEMBLY OF THE THERMAL GUARD

In most situations, final assembly of the thermal guard 1 takes place in the field. There is no set way to assemble the thermal guard, and the exact sequence depends upon the number and arrangement of obstructions adjacent the pipe to be guarded. The installer may wish to attach first and second clamp brackets 3 and 4 to pipe 2 first, or he may attach first and second clamp brackets 3 and 4 to the first and second shield members 5 and 8 first. Thus the assembly sequence set forth below is by way of example rather than a required sequence.

As illustrated in FIGS. 1 and 4, first and second clamp brackets 3 and 4 are attached to first and second shield members 5 and 8 by clamp-to-shield fastener means 12 such as threaded bolts 60.

Second starter plate 17 as preassembled on fourth clamp bracket 44 illustrated in FIG. 5 is then placed over first end edge 9 of second shield member 8. First and second end members 29 and 30 of second shield member 8 are then attached to fourth clamp bracket 44 by inserting a threaded bolt 60 through second end member 30 of second shield member 8 and into threaded insert 58, and inserting another threaded bolt 60 through first end member 29 of second shield member 8 and into threaded insert 58.

Another second starter plate 17 identical to the starter plate just described and preassembled on another fourth clamp bracket 44 as just described is attached to second end edge 10 of second shield member 8 by inserting threaded bolt 60 through an opening in second end member 30 and into threaded insert 58 attached to fourth clamp bracket 44. Another threaded bolt 60 is then inserted through an opening in first end member 29 of second shield member 8 and into threaded insert 58 attached to fourth clamp bracket 44.

Preassembled first starter plate 13 is attached to first end edge 6 of first shield member 5 by inserting threaded bolt 60 through an opening in first end member 27 of first shield member 5, and threadably into threaded insert 58 attached to first lug 38 of third clamp bracket 43. Another threaded bolt 60 is then inserted through an opening in second end member 28 of first shield member 5 and into threaded insert 58 attached to second lug 39 connected to third clamp bracket 43.

Another first starter plate 13 identical to the first starter plate 13 just described is attached to second end edge 7 of first shield member 5 in exactly the same manner just described.

The first and second shield members 5 and 8 are than placed on either side of pipe 2 and clamp bracket fastener means 11 such as threaded bolts 59 are inserted into openings in first clamp bracket 3 and threadably inserted into threaded inserts 58 on second clamp bracket 4. The threaded bolts are tightened by a screw driver inserted through an opening in the expanded metal of the first shield member 5 so that the first and second clamp brackets 3 and 4 tightly grip the pipe 2 and hold the first and second shield members 5 and 8 in a fixed position with relation to the pipe 2.

Threaded bolts 59 are then placed through openings in both of the third clamp brackets 43 and threadably inserted into threaded inserts 58 connected to fourth clamp brackets 44 and tightened so that pipe engaging portions 35 and 73 tightly grip pipe 2.

To add additional first and second shields 5 and 8, the process just recited is repeated over and over until the entire pipe 2 is shielded.

FIG. 1 illustrates the way a bend in pipe 2 is guarded. Preferably, a second clamp bracket 4 is attached to a second shield member 8 by inserting threaded bolts 60 through openings in second clamp bracket 4 and through openings in first and second end members 29 and 30 and into threaded inserts 58.

Preassembled second end plate cap 41 is then attached to first end edge 9 by inserting threaded bolts 60 through openings in first and second end members 29 and 30 of second shield member 8 and into threaded inserts 58 attached to sixth clamp bracket 47.

First end plate cap 40 is then attached to a first shield member 5, (not shown). A measurement is taken and an opening 75 is cut at the appropriate place in second shield 8 and another opening in first shield member 5 (not shown). First and second shield members 5 and 8 are then placed on opposite sides of pipe and attached together with threaded bolts 59 in first and second clamp brackets 3 (not shown) and 4.

FABRICATION AND ASSEMBLY OF FIRST MODIFIED FORM

Referring to FIGS. 9 and 10, use of the guard of the present invention with a small diameter pipe 2" is illustrated. In those instances where the pipe 2' is small, it is necessary to make a bend in first bracket assembly 3' as shown to prevent interference with the heads of bolts 60. In fabricating the guard, lands 51 and 52 should be shortened by placing bends at lines 76 and 77 respectively. Preferably first and second end members 29' and 30' are then attached to second clamp bracket by threaded bolts 60 as illustrated. There is no change in the fabrication for connecting first shield member 5 to first clamp bracket 3 and 4 as previously described and as it relates to the illustration in FIG. 4.

Fabrication of the first and second starter plates 13 and 17 illustrated in FIG. 9 is unchanged from the fabrication of first and second starter plates 13 and 17 illustrated in FIG. 3.

Assembly of the thermal guard illustrated in FIGS. 9 and 10 may be as discussed above for the thermal guard illustrated in FIGS. 3 and 5 except that because of the close tolerance between first clamp bracket 3' and 4, it is preferred that the first and second shield members 5 and 8 be connected to their respective first and second clamp brackets 3' and 4 before the first and second clamp brackets 3' and 4 are clamped to the pipe 2.

As may be seen in FIG. 9, portions 23' and 24' of first starter plate 13 overlap portions 25' and 26' of second starter plate 17 to a greater extent than in FIG. 3.

Fabrication and Assembly of end caps for pipe sizes similar to those illustrated in FIGS. 9 and 10 is not illustrated or the description repeated since it would be the same as described for first and second end caps 40 and 41 illustrated in FIGS. 1, 2 and 8 above.

FABRICATION AND ASSEMBLY OF THE SECOND MODIFIED FORM

Referring to FIGS. 11 and 12, use of the guard of the present invention with a large diameter pipe 2" is illustrated. A description of the fabrication of first and second shield members 5" and 8" is not repeated since they are the same for first and second shield members 5 and 8 illustrated in FIGS. 3 and 4. Assembly of the first and second shield members 5" and 8" is also identical and is not repeated except to note that because of the larger size pipe 2", the first and second clamp brackets 3 and 4 are further apart thus leaving a space between shield edges 33 and 34 and edges 78 and 79 of lands 51 and 52 respectively of second shield member 8".

Fabrication of the first and second starter plates 13 and 17 illustrated in FIG. 11 is unchanged from the fabrication of first and second starter plates 13 and 17 illustrated in FIG. 3.

Assembly of the thermal guard illustrated in FIGS. 11 and 12 may be as discussed above for the thermal guard illustrated in FIGS. 3 and 5 and is not repeated.

As may be seen in FIG. 11 there is less overlap 23" and 24" of first starter plate 13 upon overlapped portions 25" and 26" of second starter plate 17 than was the case of first and second starter plates 13 and 17 illustrated in FIG. 3.

Fabrication and assembly of the end plate caps for connection to a pipe having the size illustrated in FIGS. 11 and 12 is not illustrated or described since it would be identical to the fabrication and assembly of first and second end plate caps 40 and 41 illustrated in FIG. 7 and previously described.

I claim:
1. A thermal guard for a pipe comprising:
   a. a first clamp bracket dimensioned for clamping engagement with said pipe;
   b. a second clamp bracket spaced from said first clamp bracket and dimensioned for clamping engagement with said pipe;
   c. a first shield member spaced from and partially surrounding said pipe and having first and second end edges;
   d. a second shield member spaced from and partially surrounding said pipe and having first and second end edges disposed in close proximity to said first and second end edges respectively of said first shield member;
   e. clamp bracket fastener means joining said first and second clamp brackets so as to hold said pipe in a close embrace;
   f. clamp-to-shield fastener means joining said first and second shield members to said first and second clamp brackets;
   g. a first starter plate having an inner edge in close proximity to a first portion of the circumference of said pipe and an outer edge in close proximity to said first end edge of said first shield member;
   h. a second starter plate having an inner edge in close proximity to a second portion of the circumference of said pipe; and
   i. starter plate joining means for attaching said first and second starter plates to said pipe.

2. A thermal guard as described in claim 1 comprising:
   a. said inner edges of said first and second starter plates are each formed with a notch for more closely matching the contour of said pipe; and
   b. portions of said first and second starter plates overlap one another.

3. A thermal guard as described in claim 2 wherein;
   a. said notches of said inner edges of said first and second starter plates are formed in a "V" shape.

4. A thermal guard as described in claim 1 comprising:
   a. said first shield member is formed with first and second end members;
   b. said second shield member is formed with first and second end members; and
   c. said first and second shield members are dimensioned to have a first position wherein said first and second end members of said first shield member overlap a portion of said second shield member and a second position wherein said first and second end members of said first shield member do not overlap but have shield edges in close proximity to said second shield member.

5. A thermal guard as described in claim 1 comprising:
   a. said starter plate joining means for attaching said first and second starter plates to said pipe includes:

(1) a third clamp bracket dimensioned for clamping engagement with said pipe;
(2) a fourth clamp bracket spaced from said third clamp bracket and dimensioned for clamping engagement with said pipe;
(3) clamp bracket fastener means joining said third and fourth clamp brackets so as to hold said pipe in a close embrace;
(4) weld means joining said first starter plate to said fourth clamp bracket; and
(5) weld means joining said second starter plate to said third clamp bracket.

6. A thermal guard as described in claim 1 comprising:
   a. a first end plate cap dimensioned for covering a portion of said first end edges of said first and second shield members;
   b. a second end plate cap dimensioned for covering a portion of said first end edges of said first and second shield members and in combination with said first end plate cap covering substantially all of said first end edges of said first and second shield members;
   c. said first and second end plate caps are mounted respectively on said first end edges of said first and second shield members so as to partially overlap one another; and
   d. cap joining means joining said first and second end plate caps to said first and second shield members.

7. A thermal guard as described in claim 6 comprising:
   a. said cap joining means for joining said first and second end plate caps to said first and second shield members includes:
   (1) a fifth clamp bracket dimensioned for engagement with said first end plate cap;
   (2) a sixth clamp bracket spaced from said fifth clamp bracket and dimensioned for engagement with said second end plate cap;
   (3) clamp bracket fastener means joining said fifth and sixth clamp brackets so as to hold said fifth and sixth clamp brackets;
   (4) weld means joining said first end plate cap to said fifth clamp bracket; and
   (5) weld means joining said second end plate cap to said sixth clamp bracket.

8. A thermal guard as described in claim 7 comprising:
   a. said first clamp bracket includes a pipe engaging portion formed in the shape of a "V", a first extension connected to one end of said pipe engaging portion and a second extension connected to the other end of said pipe engaging portion, and a first lug connected to said first extension and a second lug connected to said second extension.

9. A thermal guard as described in claim 4 comprising:
   a. said first and second shield members are formed from expanded sheet metal.

* * * * *